Dec. 27, 1960
R. G. DAY
2,965,980
COMPUTING DEVICE
Filed March 14, 1960
2 Sheets-Sheet 1
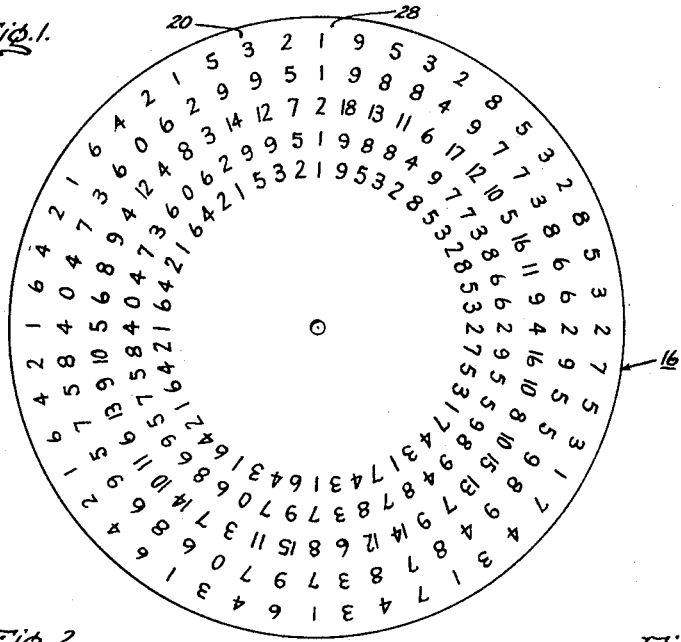
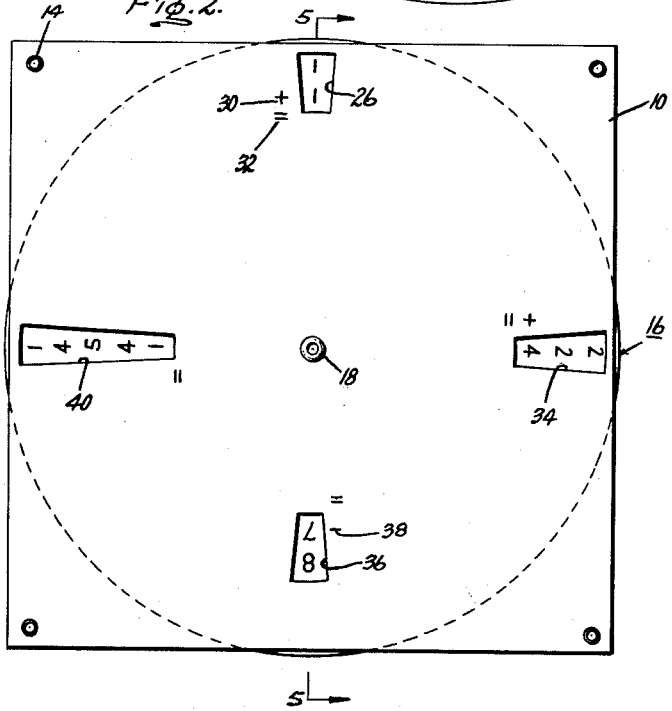
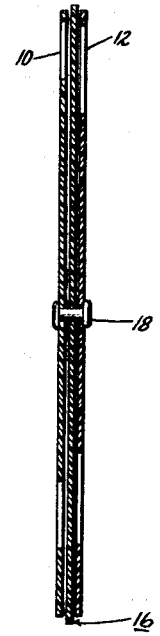
INVENTOR.
Robert G. Day,
BY Just & Orish
Attorneys.

Dec. 27, 1960

R. G. DAY 2,965,980

COMPUTING DEVICE

Filed March 14, 1960

INVENTOR.
Robert G. Day,
BY *Lust & Orish*
Attorneys

United States Patent Office 2,965,980
Patented Dec. 27, 1960

2,965,980
COMPUTING DEVICE
Robert G. Day, 6919 Westlawn Road, Fort Wayne, Ind.
Filed Mar. 14, 1960, Ser. No. 14,952
7 Claims. (Cl. 35—31)

The present invention relates to a computing device and more particularly to a device useful in teaching the fundamentals of arithmetic.

School children in the first to fourth grades are taught the basic fundamentals of arithmetic, which include addition, subtraction, multiplication and division. As an aid in teaching, flash cards which present typical problems and answers are used; such flash cards are generally made of a panel of cardboard or the like having imprinted on one side a typical arithmetic problem and on the other side the same problem with the answer. As a typical example, the problem of "2 plus 2" may be placed on the front side of the card and the same problem on the back side with the answer "4." Flash cards are packaged, ordinarily, in boxes, with three or four addition or subtraction combinations to a box; these are quite expensive when all of the possible two-digit addition, subtraction, multiplication and division combinations are desired, and are also bulky to handle and transport. Furthermore, since a single card can present only a single problem, a huge number of cards are needed to compose a complete set, which raises the possibility of individual cards being lost or mislaid.

It has been established that flash cards are a definite need in aiding children to learn to add, subtract, multiply and divide; this being true, it becomes desirable that such cards or the equivalent thereof be within the reach of all in the respects of economy and facility of use.

In view of the foregoing, it is an object of this invention to provide a computing device in the form of a unitary structure which may be manipulated to present individually a large number of different problems and answers as may be desired.

It is another object of this invention to provide a computing device which may be manually manipulated to present individually all two-digit addition problems, all two-digit subtraction probems, as well as forty-eight three-digit addition problems and forty-eight five-digit addition problems, these problems appearing on one side of a card and the answers appearing on the reverse side.

It is still another object of this invention to provide a computing device which is manually manipulable to present arithmetic problems on one side and answers on the opposite side.

It is yet another object of this invention to provide a computing device which utilizes a number wheel rotatably interposed between two properly apertured masks or panels, the number wheel having a precise pattern of numbers thereon which may be used in presenting two-digit, three-digit and five-digit addition problems as well as subtraction problems.

Other objects will become apparent as the description proceeds.

To the accomplishment of the above and related objects, the invention may be embodied in the forms illustrated in the accompanying drawings, attention being called to the fact, however, that the drawings are illustrative only and that specific change may be made in the specific constructions illustrated and described, so long as the scope of the appended claims is not violated.

In the drawings:

Fig. 1 is a side elevation of the front side of the number wheel or disc;

Fig. 2 is a front elevation of an operating embodiment of this invention;

Fig. 5 is a sectional illustration taken substantially along section line 5—5 of Fig. 2.

Figure 4:
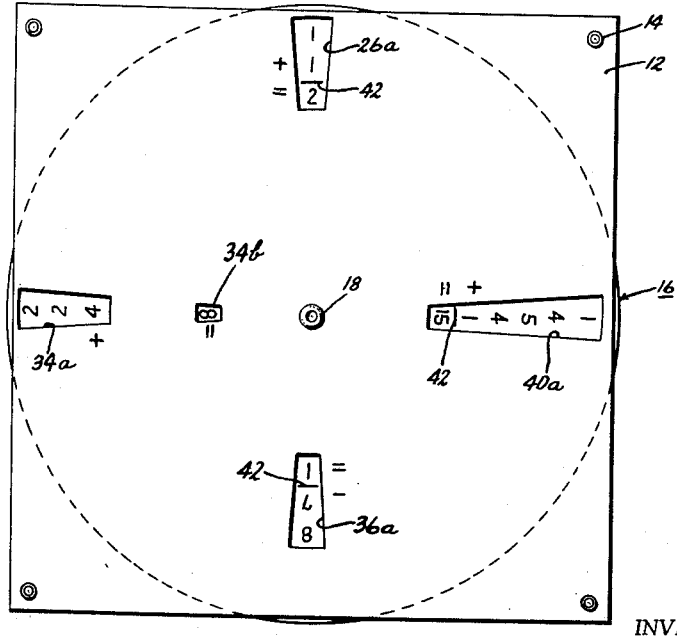
Fig. 4 is a rear elevation of the embodiment of Fig. 2.

Referring to the drawings, a working embodiment of the invention comprises front and rear panels or masks 10 and 12 which may be made of any suitable, self-supporting material such as cardboard, plastic, metal, wood or the like. The panels as shown in Figs. 2 and 4 are square and congruent and are held against rotation with respect to each other by means of a rivet, pin or the like 14 passing through one corner of each. Other means for holding the two panels against relative rotation may be used without departing from the scope of this invention.

Interposed between the two panels 10 and 12 is a number wheel or disc 16 having a diameter which is slightly longer than the width dimension of the panels but shorter than the diagonal thereof. A shaft in the form of a rivet, spindle or pin 18 passes through the centers of the two panels 10 and 12 and preferably is secured at the opposite ends to the panels. The axis of the shaft preferably is perpendicular to the planes of the two panels. The disc 16 is mounted for rotation on the shaft, the latter passing through the disc center. As illustrated in Figs. 2, 4 and 5, the disc may be manually rotated about the shaft 18 with respect to the two panels 10 and 12.

The disc 16 is provided on its opposite sides, respectively, with two patterns of numbers, the numbers of each pattern being arranged in a plurality of contiguous circumferential rows which are concentric with respect to each other and the disc axis. The numbers in the circumferential rows are also aligned in a plurality of radial columns, such columns coinciding with diameters of the disc. Particular numbers composing the patterns in a working embodiment of this invention are precisely given in both Figs. 1 and 3; however, it will be understood by persons skilled in the art that these numbers may be rearranged in precise relationship, as will appear from the following, without departing from the spirit and scope of this invention.

Considering the pattern of numbers as illustrated in Fig. 1 first, it will be noted that there are five circumferential rows. Considering the individual radial columns, such as the column indicated by the reference numeral 20, the radially inner and outer numbers of each column are identical. For example, in the column 20 the radially inner and outer numbers are "3." In each column, the two numbers radially adjacent the inner and outer numbers are also identical; for example, in the column 20 the two numbers "9" are radially adjacent the inner and outer numbers "3." Lastly, the middle number in each column is the sum of the two adjacent numbers in the respective column reading either radially outwardly from the middle number or radially inwardly. For example, in the column 20, the figure "12" appears in the middle, this figure being the sum of the two numbers "9" and "3" as they appear radially outwardly from the "12" as well as radially inwardly. This columnar arrangement of the numbers is unique and contributes to the versatility of the invention as will appear from the following description. Forty-eight radial columns appear in Fig. 1; however, a different number of columns may be used without departing from the spirit and scope of this invention.

Figure 3:
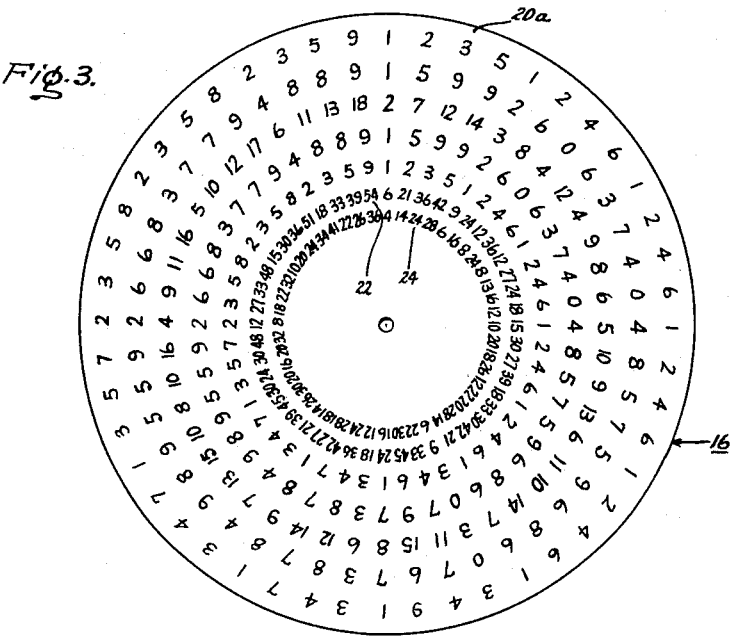
Fig. 3 is a rear elevation of the number wheel or disc of Fig. 1.

The back side of the disc 16 as illustrated in Fig. 3 has a pattern of numbers thereon, this pattern being identical to the pattern on the front side and preferably precisely juxtaposed. For example, the column 20a (Fig. 3) is identical to and imprinted on the rear side of the disc 16 directly opposite from that of the column 20. All of the other forty-eight columns are similarly juxtaposed. In addition to the five circumferential rows of numbers, two additional rows 22 and 24 are provided, these being concentric with respect to the disc center and disposed contiguous with each other. Also, the numbers in these two rows 22 and 24 are radially aligned with the radial columns previously described; for example, the numbers "36" and "24" as appear in the two rows 22 and 24 are aligned, respectively, with the radial column 20a.

Considering for the moment each radial column (Fig. 3), it will be noted that the numbers in row 22 correspond to the sum of the five outer numbers in the respective radial column. For example, the number "36" in the column 20a is the sum of the five figures "3," "9," "12," "9" and "3" in that particular column. On the other hand, the numbers in the row 24 are selected to be the sum of the three radially outer numbers of each column; in column 20a, the figure "24" is the sum of the three outermost numbers "12," "9" and "3" in the column 20a.

Referring now to Fig. 2, the front panel 10 is provided with a 2-digit window 26, this window being elongated in a radial direction so as to register with and expose only the two outermost numbers of one radial column. In Fig. 2, the window 26 exposes the two figures "1" of the aligned radial column 28; on the face of the panel 10 to the left-hand side of the window 26 is a "plus" sign 30 and an "equals" sign 32 disposed adjacent to the bottom of the window.

Referring to Fig. 4, the panel 12 is provided with a window 26a of three-digit size, this window being juxtaposed with respect to the front window 26 and registered with and exposing the three outer numbers of a given radial column. As will now appear obvious, the window 26 of Fig. 2 presents the problem of addition of "1 plus 1," while the window 26a exposes the same problem and also the answer. Plus marks and equal signs imprinted on the panel 12 indicate the type of problem presented and the location of the answer.

Referring to Fig. 2, a three-digit window 34 spaced 90° from the window 26 is provided in the panel 10. As illustrated, the window 34 is spaced 90° from the window 26. Only the three outermost numbers of a radial column are exposed, the plus and equal signs opposite this window indicating a problem in addition. In Fig. 4, an identical window 34a is provided in panel 12, this window being of the same size and juxtaposed with respect to the window 34. However, radially aligned with this window 34a and coinciding with the row 24 of numbers on the disc 16 (Fig. 3) is another window 34b which is just large enough to expose only one number combination in the row. In the addition problem exposed by the window 34a, the answer "8" as appears in the row 24 is exposed by the window 34b; obviously the window 34b must be large enough to expose two-digit answers without overlapping adjacent answers in the same row.

Another two-digit window 36 is provided in the panel 10 (Fig. 2) diametrically opposite the window 26, this window 36 being of two-digit size and overlying the third and fourth numbers (counting radially inwardly) of a particular column. A minus sign 38 is imprinted on the panel adjacent to the window 36, thereby indicating that a problem of subtraction is presented.

In Fig. 4, the rear panel 12 is provided with a three-digit window 36a which is juxtaposed with respect to the window 36 but elongated enough to expose the fifth or radially innermost number of the respective radial column. As seen, the window 36a presents not only the subtraction problem as is exposed by the window 36 of Fig. 2, but also the answer to this problem opposite the "equals" sign.

In Fig. 2, a five-digit window 40 is provided in the panel 10 diametrically opposite the window 34, this five-digit window 40 overlying and exposing all of the numbers in one radial column. In the rear panel 12 (Fig. 4) is a window 40a precisely juxtaposed with respect to the front panel window 40 but slightly longer radially inwardly to expose one number combination of the number row 22 (Fig. 3). The numbers in the row 22 obviously provide the answer to the problem of addition as is exposed by the front panel window 40.

If desired, summing bars or answer lines 42 may be provided in the windows 26a, 40a and 36a in the form of a web of material formed either integrally with the panel 12 or fastened thereto transversely of the respectve window. This bar 42 obviously separates the exposed answer from the exposed problem.

In operation, the disc 16 is rotated inside the two panels 10 and 12 until a desired problem is aligned with one of the four windows 26, 34, 36 or 40. The operator may then observe the opposite side of the device and read the answer to the problem through the particular window in panel 12. Obviously, the answers exposed by the panel 12 need only be used to check the operator's answer which he mentally calculates by examining the problems exposed through the windows of the panel 10. By turning the disc 16 an increment corresponding to the width of one radial column of numbers, a new set of problems is presented.

Not only does the present invention present all possible two-digit problems of addition, it also presents all two-digit problems of subtraction. This is accomplished by the arrangement of the numbers in the respective columns as previously described, the central number of each column always being the sum of the two outermost as well as innermost numbers of the same column. This central number therefore becomes the answer to the problem of addition as presented by the window 26 and also the first number of the subtraction problem as is exposed by the window 36.

By the simple expedient of adding only two additional circumferential rows of numbers as shown in Fig. 3, the same numbers as used for presenting the two-digit addition and subtraction problems may be used for presenting and solving three-digit and five-digit problems of addition, respectively.

By following the philosophy of the number patterns as they appear in Fig. 1, it is possible to provide a computing device which will multiply and divide. This may be achieved by using numbers in the innermost and outermost positions of each column which are identical and two numbers immediately adjacent thereto identical to each other. The number in the center of the column is the multiplied result of the two numbers in the outermost positions of the respective column. With such numbers so arranged, the window 26 will present the problem of multiplication while the window 26a on the reverse side will present the problem and the answer. Similarly, the problem of division will be presented by the window 36 while the answer is presented on the reverse side by the window 36a. A typical column for presenting multiplication and division problems could have the numbers (reading radially inwardly from the outermost number) "9," "7," "63," "7" and "9."

What is claimed is:

1. A computing device comprising front and rear congruent superposed square-shaped panels, a flat disc sandwiched between said panels, a spindle fastened to and passing through said panels at the centers thereof, the axis of said spindle being perpendicular to the planes of said panels, said disc rotatably mounted on said spindle, the axis of said disc coinciding with the axis of said spindle, the diameter of said disc being longer than the width but shorter than the diagonal of said panels; said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; the second pattern being identical to the first pattern with the numbers of both patterns juxtaposed, sixth and seventh circumferential rows of numbers concentric about said disc axis and contiguous with each other and the radially innermost row of said second pattern, the numbers of said sixth and seventh rows being radially aligned with the radial columns of said second pattern, said seventh row being radially inside said sixth row, the numbers in the seventh row being the sum of the numbers in the three radially outer rows of the respective radial columns, the numbers in the sixth row being the sum of the numbers in the five radially outer rows of the respective radial columns; said front panel being adjacent to the side of said disc having the first pattern; a first two-digit window in said front panel in registry with and exposing only the two outer numbers of one radial column, a first three-digit window in said rear panel in registry with and exposing only the three outer numbers of one radial column of said second pattern, said two-digit and three-digit windows being juxtaposed; a second three-digit window in said front panel in registry with and exposing only the three outer numbers of one radial column and angularly spaced from said two-digit window, a second three-digit window in said rear panel juxtaposed with said second window in said front panel, a separate answer window in said rear panel radially aligned with said second rear panel window and registered with said seventh row of numbers; a third two-digit window in said front panel in registry with and exposing only the third and fourth numbers of one radial column counting radially inwardly from the outermost number, said third two-digit window being angularly spaced from said second three-digit window, a third three-digit window in said rear panel juxtaposed with said third front panel window and in registry with and exposing only the third, fourth and fifth numbers of one radial column counting radially inwardly from the outermost number; a fourth five-digit window in said front panel in registry with and exposing only the five numbers in one radial column, said fourth front panel window being angularly spaced from said third front panel window, and a fourth six-digit window in said rear panel juxtaposed with said fourth front panel window and in registry with and exposing only the six outer numbers of one radial column.

3. A computing device comprising front and rear flat panels, a flat disc sandwiched between said panels, a shaft fastened to and passing through said panels, the axis of said shaft being perpendicular to the planes of said panels, said disc rotatably mounted on said shaft, the axis of said disc coinciding with the axis of said shaft, said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; the second pattern being identical to the first pattern with the numbers of both patterns juxtaposed, a first two-digit window in said front panel in registry with and exposing only the two outer numbers of one radial column, a first three-digit window in said rear panel in registry with and exposing only the three outer numbers of one radial column of said second pattern, said two-digit and three-digit windows being juxtaposed.

4. A computing device comprising front and rear flat panels, a flat disc interposed between said panels and mounted thereon for rotation about its axis, said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; the second pattern being identical to the first pattern with the numbers of both patterns juxtaposed, a first two-digit window in said front panel in registry with and exposing only the two outer numbers of one radial column, a first three-digit window in said rear panel in registry with and exposing only the three outer numbers of one radial column of said second pattern, said two-digit and three-digit windows being juxtaposed; a third two-digit window in said front panel in registry with and exposing only the third and fourth numbers of one radial column counting radially inwardly from the outermost number, said third two-digit window being angularly spaced from said second three-digit window, a third three-digit window in said rear panel juxtaposed with said third front panel window and in registry with and exposing only the third, fourth and fifth numbers of one radial column counting radially inwardly from the outermost number.

5. A computing device comprising front and rear flat panels, a flat disc interposed between said panels and mounted thereon for rotation about its axis; said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; the second pattern being identical to the first pattern with the numbers of both patterns juxtaposed, a sixth circumferential row of numbers concentric about said disc axis and adjacent to the radially innermost row of said second pattern, the numbers of said sixth row being radially aligned with the radial columns of said second pattern and being the sum respectively of the numbers in the three radially outer rows, said front panel being adjacent to the side of said disc having the first pattern; a first two-digit window in said front panel in registry with and exposing only the two outer numbers of one radial column, a first three-digit window in said rear panel in registry with and exposing only the three outer numbers of one radial column of said second pattern, said two-digit and three-digit windows being juxtaposed; a second three-digit window in said front panel in registry with and exposing only the three outer numbers of one radial column and angularly spaced from said two-digit window, a second three-digit window in said rear panel juxtaposed with said second window in said front panel, a separate answer window in said rear panel radially aligned with said second rear panel window and registered with said sixth row of numbers; a third two-digit window in said front panel in registry with and exposing only the third and fourth numbers of one radial column counting radially inwardly from the outermost number, said third two-digit window being angularly spaced from said second three-digit window, a third three-digit window in said rear panel juxtaposed with said third front panel window and in registry with and exposing only the third, fourth and fifth numbers of one radial column counting radially inwardly from the outermost number.

6. A computing device comprising front and rear flat panels, a flat disc interposed between said panels and mounted thereon for rotation about its axis; said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; the second pattern being identical to the first pattern with the numbers of both patterns juxtaposed, sixth and seventh circumferential rows of numbers concentric about said disc axis and contiguous with each other and the radially innermost row of said second pattern, the numbers of said sixth and seventh rows being radially aligned with the radial columns of said second pattern, said seventh row being radially inside said sixth row, the numbers in the seventh row being the sum of the numbers in the three radially outer rows of the respective radial columns, the numbers in the sixth row being the sum of the numbers in the five radially outer rows of the respective radial columns; said front panel being adjacent to the side of said disc having the first pattern; a first two-digit window in said front panel in registry with and exposing only the two outer numbers of one radial column, a first window in said rear panel in registry with and exposing the middle number of one radial column of said second pattern, said windows being juxtaposed; a second three-digit window in said front panel in registry with and exposing only the three outer numbers of one radial column and angularly spaced from said two-digit window, an answer window in said rear panel registered with said seventh row of numbers, said answer window being radially aligned with said second window; a third two-digit window in said front panel in registry with and exposing only the third and fourth numbers of one radial column counting radially inwardly from the outermost number, a third window in said rear panel in registry with the fifth number of one radial column counting radially inwardly from the outermost number, said third rear panel window being radially aligned with said third front panel window; a fourth five-digit window in said front panel in registry with and exposing only the five numbers in one radial column, and a fourth window in said rear panel radially aligned with said fourth front panel window and registered with and exposing one number in said sixth row.

7. A computing device comprising front and rear flat panels, a flat disc interposed between said panels and mounted thereon for rotation about its axis; said disc having first and second patterns of numbers on the opposite sides, respectively, the numbers of each pattern being arranged in a plurality of contiguous circumferential rows which are concentric with respect to each other and the disc axis, the numbers in the circumferential rows being aligned in a plurality of radial columns; said first pattern having five circumferential rows, the radially inner and outer numbers of each radial column of said first pattern being identical, the two numbers of each column radially adjacent to said inner and outer numbers being identical, and the number radially between said two numbers being the sum of the radially outer two numbers as well as the radially inner two numbers; a first window in said front panel exposing the two outer numbers of one radial column, a first window in said rear panel exposing the middle number of a radial column, said middle number being the sum of said two outer numbers; a second window in said front panel exposing the third and fourth numbers of one radial column counting radially inwardly from the outermost number, and a second window in said rear panel exposing the radially inner number of one radial column, said exposed radially inner number being the difference of said third and fourth numbers.

References Cited in the file of this patent

UNITED STATES PATENTS

| | | |
|---|---|---|
| 2,709,309 | Stacey | May 31, 1955 |
| 2,792,993 | Schramm | May 21, 1957 |
| 2,797,499 | Lagerdahl | July 2, 1957 |